(No Model.)

C. HOFFMAN.
RECEPTACLE FOR GROWING PLANTS.

No. 499,996. Patented June 20, 1893.

WITNESSES
Severance
Arthur L. Bryant

INVENTOR
Carl Hoffman,
By Edson Bros.
Attys.

UNITED STATES PATENT OFFICE.

CARL HOFFMAN, OF ROSEBURG, OREGON.

RECEPTACLE FOR GROWING PLANTS.

SPECIFICATION forming part of Letters Patent No. 499,996, dated June 20, 1893.

Application filed February 21, 1893. Serial No. 463,153. (No model.)

*To all whom it may concern:*

Be it known that I, CARL HOFFMAN, a citizen of the United States, residing at Roseburg, in the county of Douglas and State of Oregon, have invented certain new and useful Improvements in Receptacles for Growing Plants; and I do hereby declare the following to be a full, clear, and exact description of the invention, such as will enable others skilled in the art to which it appertains to make and use the same.

My invention relates to improvements in pots or receptacles for growing plants; and the main object of the invention is to provide a simple, cheap and durable article of the class described which can, when the plant has attained such growth as to necessitate transplanting, be readily removed without disturbing the soil about the roots of the plant and therefore without danger of injury to the roots.

Another object of my invention is to provide a simple and ornamental receptacle for the purpose specified which can be easily moved from place to place, as may be desirable.

With these ends in view, my improved receptacle for growing plants consists of a base piece or stand; and a series of upright sides detachably connected to said base and to each other whereby they can be readily removed without disturbing the soil in the receptacle.

My invention further consists in the peculiar construction and arrangement of parts as will be hereinafter more fully pointed out and claimed.

Figure 1:
Figure 2:
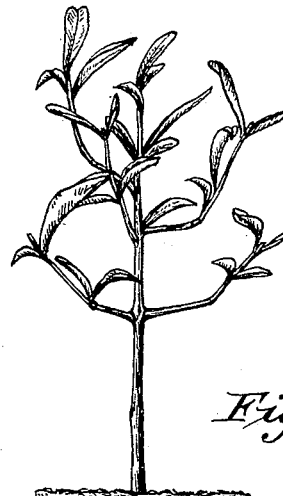
Figure 3:
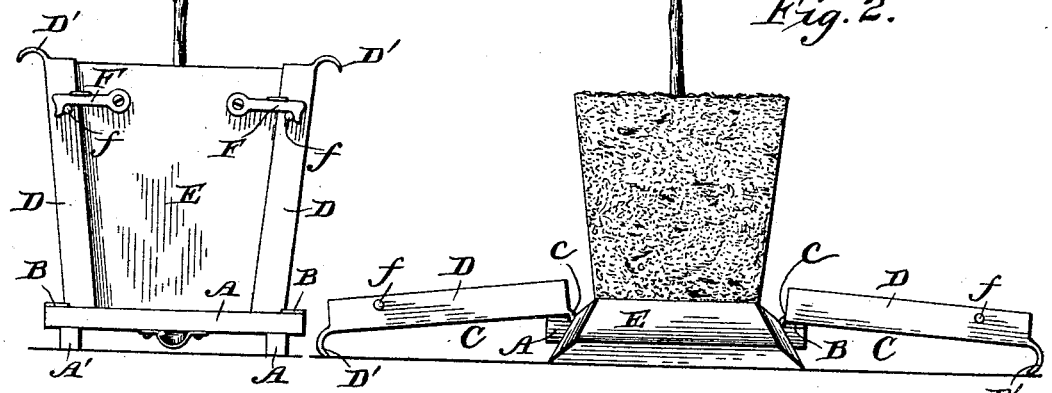
Figure 3:
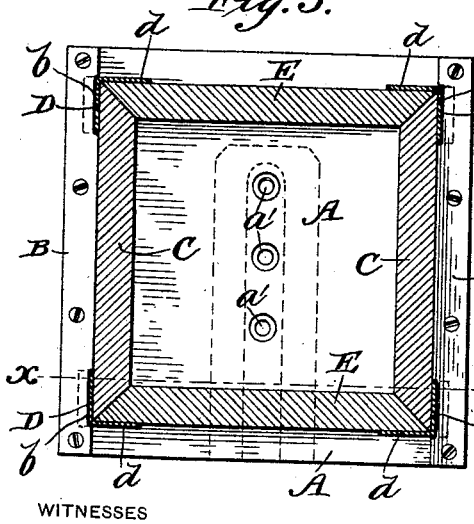
Figure 4:
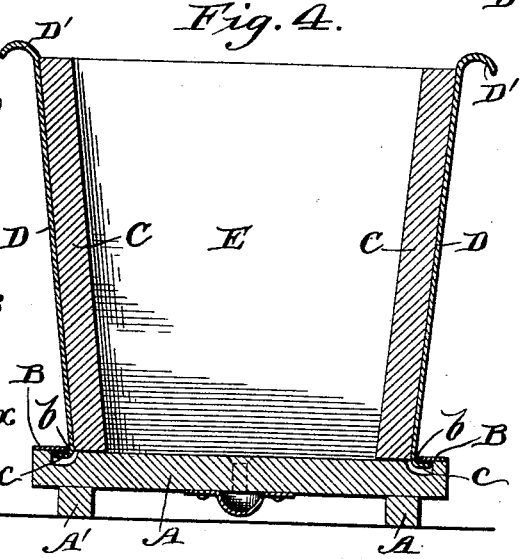

In the accompanying drawings—Figure 1 is a side elevation of my improved receptacle, showing a plant in place therein. Fig. 2 is a similar view showing the sides in their lowered position. Fig. 3 is a horizontal sectional view through the receptacle, the plant and soil being removed therefrom. Fig. 4 is a vertical sectional view on the line $x$—$x$ of Fig. 3.

Like letters of reference denote corresponding parts in all the figures of the drawings, referring to which—

A designates the base of my improved receptacle, which base may be of any desired size and material and is preferably made rectangular in shape and mounted on suitable legs or supports, A′, so as to raise the same above the surface of the ground or floor.

To the upper surface of the base A, are rigidly attached strengthening strips or plates B, the outer edges of which preferably terminate or lie flush with the side edges of the base A; and in the inner edges of the plates or strips, B, preferably near the ends thereof, are formed notches $b$, the sides of which align with the sides of sockets formed in the base A and partially covered by the strips or plates B.

The side pieces C of my improved receptacle are provided with laterally projecting feet or flanges, $c$, which are rigidly attached to said sides and are designed and adapted to fit or take into the sockets formed in the base block, A, and bear close against the under side of the solid portion of the strips or plates, B, which, as before stated, partially cover the said sockets in the base A. The feet or flanges, $c$, are, preferably, formed integral with the strengthening strips or corner pieces D, which are rigidly attached to the outside of the side pieces, C, and extend beyond the ends thereof. As shown in Fig. 3 of the drawings the ends of the sides, C, are beveled and the corner pieces, D, are bent upon themselves so that the portions $d$ thereof extend across such beveled ends at right angles to the width of the sides C. The ends of the end pieces E of the receptacle are also beveled, as shown in Fig. 3, and such end pieces are fitted between the beveled ends of the sides, C, and the portions $d$ of the corner pieces and are held securely in place thereby and by means of hooks, F, which are pivotally connected to the outer sides of the end pieces E, and are adapted to take over studs or pins $f$, rigidly attached to or formed integral with the corner pieces D.

It will be seen that I have provided a simple and strong receptacle for the pupose described, the interior sides of which are preferably smooth. The joints between the sides, C, and ends, E, are very close, and the corner pieces, D, besides serving to bind such sides and ends together, also prevent any moisture or soil in the receptacle from passing through such joints. The lower ends of the sides, C, and ends E form a close joint with the base block A. To permit the surplus water in the receptacle to escape therefrom, I provide a series of passages $a'$ which extend through the base block A, preferably, in a line about the center thereof; and to the under side of said block I attach a drip pipe or conduit which receives the drippings from said passages and conducts the same to one side of the receptacle. The corner pieces D, preferably, have their upper ends bent outwardly and downwardly to provide handles D' by which the receptacle can be lifted when it is desired to move the same.

When for any reason it is desired to remove the plant from the receptacle by raising the hooks, F, to clear the studs or pins f, the end pieces can be removed and the sides C turned down into the position shown in Fig. 2 of the drawings. The soil about the roots of the plant will not be disturbed by the removal of the sides and ends of the receptacle and the plant can be transplanted without danger of injuring the roots thereof.

My improved receptacle is specially designed for use by florists and nurserymen; but may also be employed in private conservatories as it presents an attractive and ornamental appearance.

I am aware that changes in the form and proportion of parts and details of construction of the devices herein shown and described can be made without departing from the spirit of my invention, and I therefore reserve the right to make such changes and alterations as fairly fall within the scope of the same.

Having thus fully described my invention, what I claim as new, and desire to secure by Letters Patent, is—

1. A receptacle, for the purpose described, consisting of a base provided with suitable sockets, side pieces detachably connected to the base, corner pieces rigidly attached to the sides and bent so that a portion thereof extends across but out of contact with the ends of the side pieces and provided at their lower ends with feet adapted to fit in the sockets in the base, and end pieces adapted to fit between the ends of the sides and the corner pieces and to be detachably connected to the side pieces, substantially as described.

2. A receptacle, for the purpose described, consisting of a base provided in its upper surface with suitable sockets, plates secured on the upper surface of the base and arranged to partially cover the sockets therein, side pieces, angular corner pieces rigidly connected to the side pieces and having their lower ends bent outwardly to form feet adapted to fit in the sockets in the base, and end pieces adapted to be fitted between the corner pieces and the ends of the side pieces and to be detachably connected to the side pieces, substantially as described.

3. A receptacle, for the purpose described, consisting of a base provided with suitable sockets, side pieces, angular corner pieces rigidly attached to the side pieces and having their lower ends bent to form feet adapted to fit into the sockets in the base and their upper ends bent to form handles, and end pieces adapted to fit between the ends of the side pieces and the corner pieces and to be detachably connected to the side pieces, substantially as described.

In testimony whereof I affix my signature in presence of two witnesses.

CARL HOFFMAN.

Witnesses:
S. C. MILLER,
J. I. CHAPMAN.